(12) United States Patent
Moen

(10) Patent No.: US 10,518,580 B2
(45) Date of Patent: Dec. 31, 2019

(54) TELESCOPING AXLE FOR AN AGRICULTURAL APPLICATOR

(71) Applicant: CNH Industrial America LLC, New Holland, PA (US)

(72) Inventor: Richard A. Moen, Glenwood, MN (US)

(73) Assignee: CNH Industrial America LLC, New Holland, PA (US)

( * ) Notice: Subject to any disclaimer, the term of this patent is extended or adjusted under 35 U.S.C. 154(b) by 161 days.

(21) Appl. No.: 15/657,775

(22) Filed: Jul. 24, 2017

(65) Prior Publication Data

US 2019/0023071 A1 Jan. 24, 2019

(51) Int. Cl.
*B60B 35/10* (2006.01)
*A01B 51/00* (2006.01)

(52) U.S. Cl.
CPC ........ *B60B 35/109* (2013.01); *B60B 35/1054* (2013.01); *A01B 51/00* (2013.01)

(58) Field of Classification Search
CPC .............. B60B 35/109; B60B 35/1054; B60B 35/1072; B62D 21/14; B62D 49/0678
USPC ................................ 301/128; 280/86.75, 638
See application file for complete search history.

(56) References Cited

U.S. PATENT DOCUMENTS 2,911,229 A * 11/1959 Strehlow ............... B60B 35/003
180/424
3,964,565 A 6/1976 Cagle et al.
5,039,129 A 8/1991 Balmer
6,145,610 A * 11/2000 Gallignani .......... B62D 55/084
180/9.48
6,827,176 B2 12/2004 Bean et al.
(Continued)

FOREIGN PATENT DOCUMENTS

JP 63195002 8/1988
WO WO-2005118379 A1 * 12/2005 ........... B60B 35/001

OTHER PUBLICATIONS

Newton Crouch, Model 40—High Clearance Adjustable Axle (HCAAT) Fertilizer and Lime Spreader, https://www.agriculture-xprt.com/products/model-40-high-clearance-adjustable-axle-hcaat-fertilizer-and-lime-spreader-421299.
(Continued)

*Primary Examiner* — Kip T Kotter
(74) *Attorney, Agent, or Firm* — Rebecca L. Henkel; Rickard K. DeMille

(57) ABSTRACT

A telescoping axle arrangement is provided for an agricultural applicator having a frame supported above a ground surface by a ground engaging wheel operatively connected to the frame by the telescoping axle arrangement. First and second slidingly engaging axle elements adapted for operative connection between the frame and the wheel, provide extension and retraction of the axle along a longitudinal axis of the axle. The second axle element includes a longitudinally extending closed-ended retention track. An axle retention element is fixedly attachable to and protrudes from the first axle element into operative engagement with the closed-ended retention track in the second axle element in such a manner that the axle retention element contacts the closed end of the retention track at a maximum permissible extension of the telescoping axle arrangement to thereby preclude further sliding extension of the second axle element with respect to the first axle element.

15 Claims, 3 Drawing Sheets

(56) References Cited

U.S. PATENT DOCUMENTS

| | | | |
|---|---|---|---|
| 6,892,124 B2 | 5/2005 | Humpal et al. | |
| 8,205,899 B2 | 6/2012 | Mackin et al. | |
| 8,280,590 B2 | 10/2012 | Mackin et al. | |
| 2005/0115746 A1* | 6/2005 | Dunn | B60B 35/003 180/6.2 |
| 2014/0224555 A1* | 8/2014 | Qian | B62D 55/084 180/9.48 |
| 2016/0176231 A1 | 6/2016 | Daffue | |

OTHER PUBLICATIONS

Wang et al, Static strength analysis and experimental studies on drive axle of track adjustable sprayer, https://www.cabdirect.org/?target=%2fcabdirect%fabstract%2f20153326030.

* cited by examiner

US 10,518,580 B2

TELESCOPING AXLE FOR AN AGRICULTURAL APPLICATOR

FIELD OF THE INVENTION

This invention generally relates to a telescoping axle arrangement for an agricultural applicator, and more particularly to an arrangement for precluding overextension of such a telescoping axle.

BACKGROUND OF THE INVENTION

Agricultural chemicals and fertilizers must be applied within very narrow time windows for maximum effectiveness. In some cases, this means that application must be performed after the crops have emerged, and sometimes even after the crops have grown to a height of several feet tall. To apply chemicals and fertilizers without damaging standing crops specialized self-propelled agricultural product applicators, having high ground clearance, such as so-called high-boy sprayers or dry product applicators, are often utilized with standing crops. The high ground clearance allows the applicator to move through the standing crops without damaging them.

Such high ground clearance applicators also typically utilize independent drive and suspension systems for each wheel of the applicator, and provide sonic means for adjusting the track width of the wheels to match the row spacing of the crop being treated. Since the row spacing varies for different types of crops, and as a matter of custom in various locations, such self-propelled applicators also typically include some apparatus for adjusting the track width to match the row spacing.

Track-width adjustments systems can be manually operable, but for ease of operation it is more typical to include a powered arrangement for adjusting track width, through use of some form of actuator, such as a hydraulic cylinder, for extending and retracting one or more axles of the applicator in a direction transverse to the direction of travel of the applicator. It is desirable to provide some form of extension limiting arrangement to stop and hold the extendable portion of the axle at a maximum permissible extended position if the track-width adjusting actuator should inadvertently become fully or partly disconnected from the axle. Prior arrangements for limiting axle extension have worked satisfactorily, but are more complex, cumbersome and costly than is desirable. Accordingly, it is desirable to provide an improved telescoping axle arrangement, that includes an improved apparatus and method for limiting axle extension.

BRIEF SUMMARY OF THE INVENTION

The invention provides an improved telescoping axle arrangement for an agricultural applicator having a frame supported above a ground surface by a ground engaging wheel operatively connected to the frame by the telescoping axle arrangement. The invention may also take other forms, such as an agricultural applicator, a frame for an agricultural applicator, or a method for adjusting track width in an agricultural applicator.

In one form of the invention, a telescoping axle arrangement may include first and second slidingly engaging axle elements adapted for operative connection between the frame and the wheel, to provide extension and retraction of the axle along a longitudinal axis of the axle. The second axle element may include a longitudinally extending closed-ended retention track. An axle retention element may be fixedly attachable to and protrude from the first axle element into operative engagement with the closed-ended retention track in the second axle element in such a manner that the axle retention element contacts the closed end of the retention track at a maximum permissible extension of the telescoping axle arrangement to thereby preclude further sliding extension of the second axle element with respect to the first axle element.

Some forms of the invention may also include a track-width adjusting element operatively connected between the first and second axle elements for selectively extending and retracting the telescoping axle for adjusting the track-width of the applicator. The track-width adjusting element may be manually operable, or include a powered element such as a hydraulic cylinder or electrically-driven linear actuator.

According to various aspects of the invention, where the frame of the applicator defines a fore-aft axis of the applicator and a transverse axis extending generally transverse to the fore-aft axis and substantially horizontal to the ground surface, the first axle element may be adapted for fixed attachment to the frame with the longitudinal axis of the telescoping axle arrangement extending generally along the transverse axis of the frame. The first axle element may include a tubular portion and the second axle element may be configured for sliding engagement within the tubular portion of the first axle element. The closed end of the retention track may be disposed within the tubular portion of the first axle element when the retention element is in contact with the closed end of the retention track. The closed-ended retention track may take any appropriate form in practicing the invention, such as an elongated slot, or be configured as a groove in the second axle element.

The first axle element may be a solid structure terminating at a distal end thereof in a mounting pad for attaching an independent suspension element operatively connecting the wheel to the mounting pad. The first axle element may include a boss for receiving the axle retention element. The axle retention element may be selected from a group of retention elements consisting of: a pin configured for insertion through and fixed attachment to the boss; and a bolt configured for threaded engagement through and fixed attachment to the boss.

A method for practicing the invention may include the step of utilizing a retention element extending from a first element of a telescoping axle into a closed-ended retention track in a second element of the telescoping axle to thereby limit extension of the second axle element with respect to the first axle element when the retention element contacts the closed end of the retention track.

Other aspects, objects and advantages of the invention will be apparent from the following detailed description and accompanying drawings of exemplary embodiments of the invention.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain exemplary embodiments, there is no intent to limit it to those embodiments. On the contrary, the intent is to cover all alternatives, modifications and equivalents included within the spirit and scope of the invention.

DETAILED DESCRIPTION OF THE INVENTION

Figure 1:
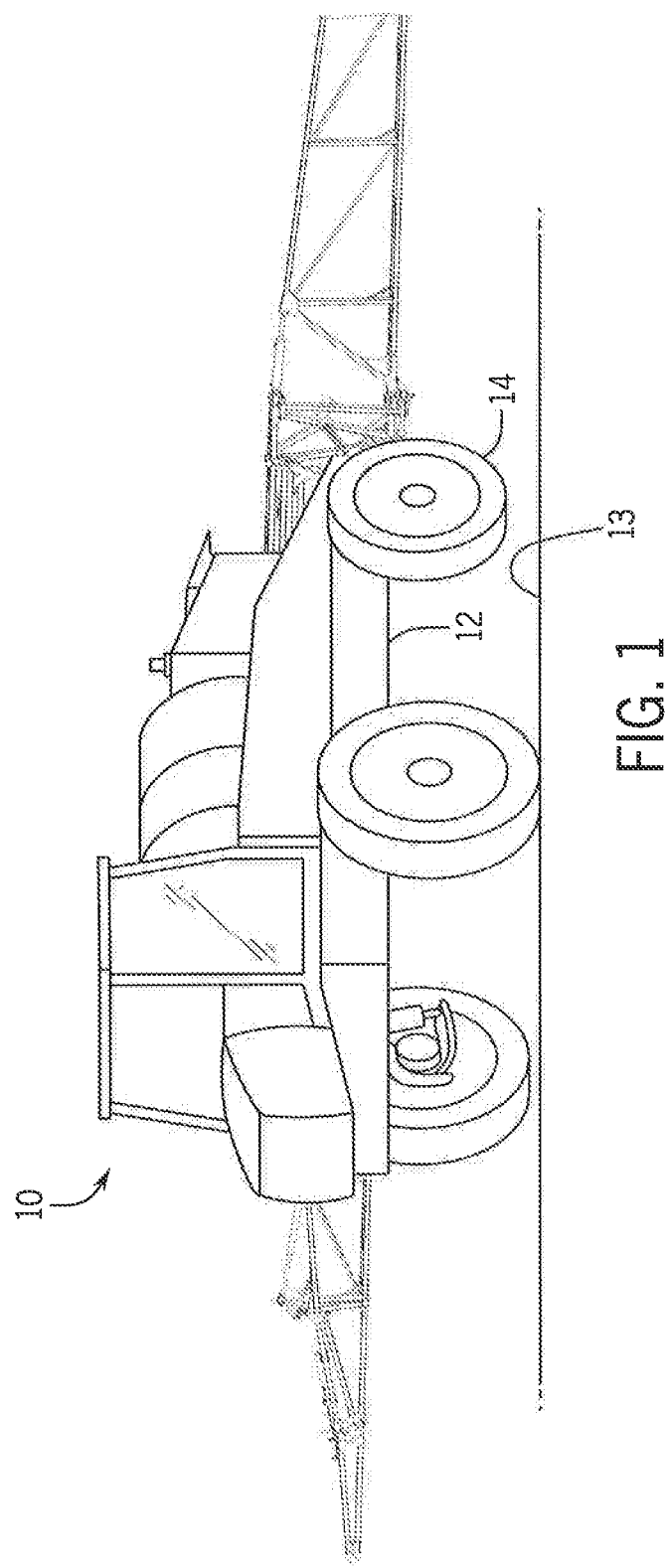
FIG. 1 is a perspective illustration of an exemplary embodiment of and agricultural product applicator including a telescoping axle, according to the invention.
Figure 2:
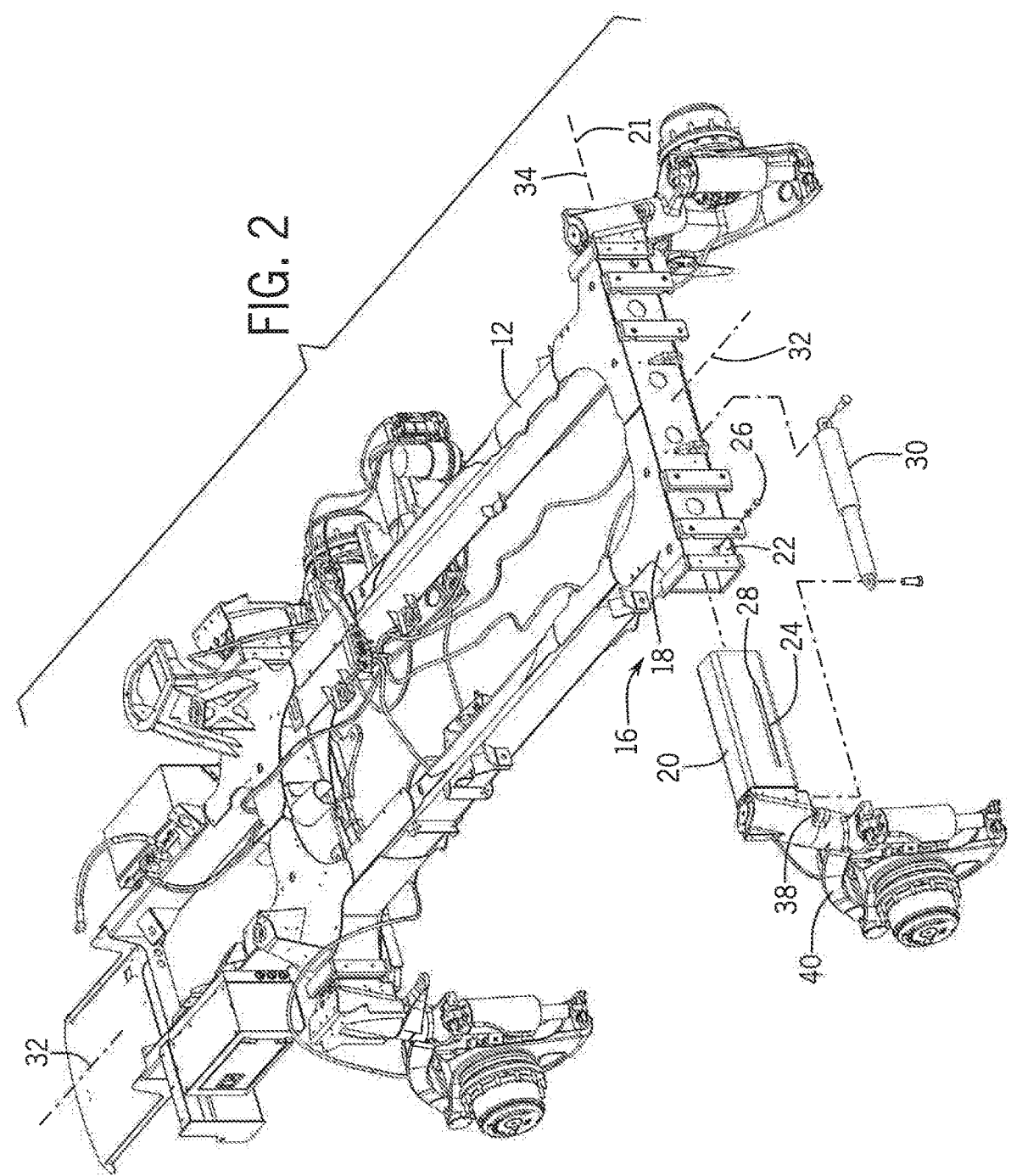
FIG. 2 is a partly exploded, perspective rear view illustration of a frame of the applicator of FIG. 1, showing a rear telescoping axle arrangement according to the invention.
Figure 3:
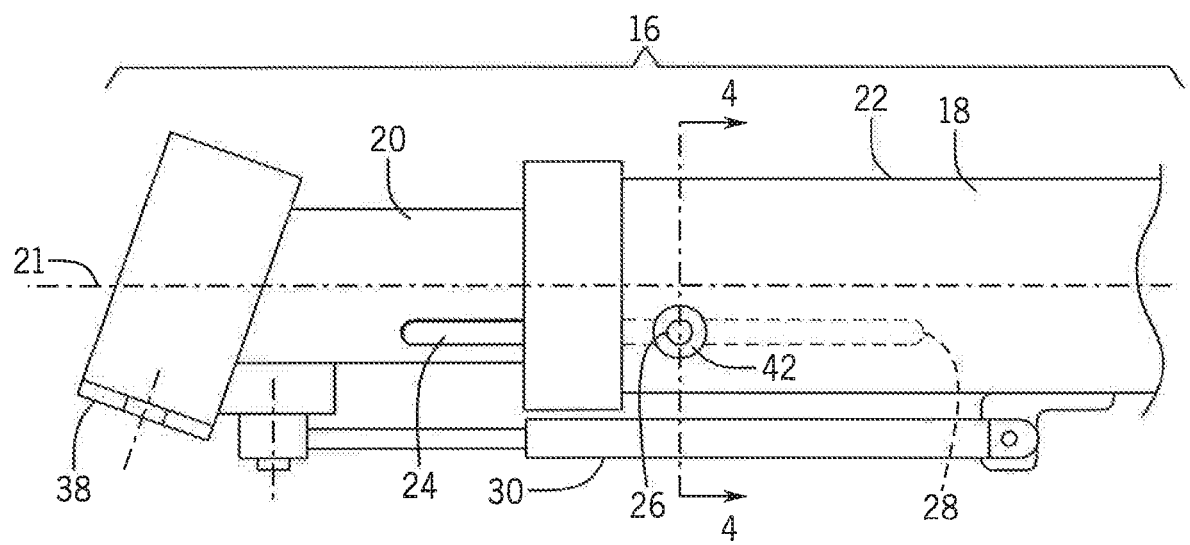
FIG. 3 is an orthographic illustration of a left rear telescoping axle of the applicator and frame of FIGS. 1 and 2, showing the exploded components of FIG. 3 in an assembled state.
Figure 4:
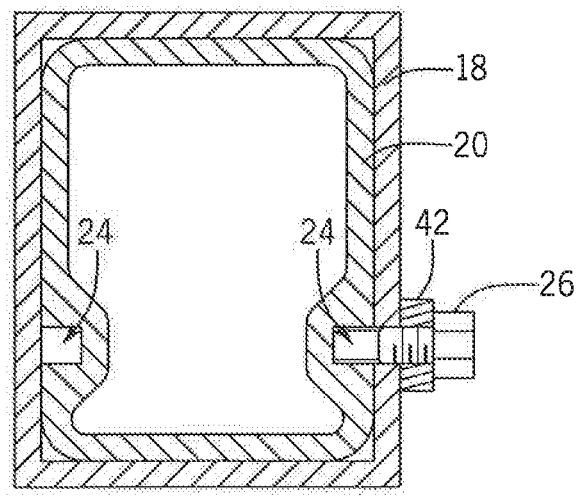
FIG. 4 is a section view, taken along line 4-4 in FIG. 3, showing a retention element engaging a retention track in a movable section of the telescoping rear axle of FIGS. 2 and 3.

FIG. 1 shows an exemplary embodiment of the invention, in the form of an agricultural applicator 10 having a frame 12, best seen in FIG. 2, supported above a ground surface 13 by a ground engaging wheel 14 operatively connected to the frame 12 by a telescoping axle arrangement 16, shown in FIGS. 2-4, according to the invention.

As shown in FIGS. 2 and 3, the exemplary embodiment of the telescoping axle arrangement 16 includes first and second slidingly engaging axle elements 18,20 adapted for operative connection between the frame 12 and the wheel 14, to provide extension and retraction of the first and second axle elements 18,20, with respect to one another, along a longitudinal axis 21 of the axle arrangement 16. In the exemplary embodiment, the first axle element is a rectangular tube 22 that is integrally joined to and forms part of the rear end of the frame 12.

In the exemplary embodiments shown in the drawings, both of the rear wheels of the applicator 10 are operatively connected to the frame 12 by telescoping axle arrangements, according to the invention, with the tube 22 serving as the first axle element for both the telescoping axle arrangements connecting both the left and right rear wheels of the applicator 10 to the frame 12. Although only the telescoping axle arrangement 16 for the left rear wheel 14 of the applicator 10 is specifically described herein, it is understood that the description would also apply to practice of the invention at other wheels of the applicator 10.

As shown in FIGS. 2-4, the second axle element 20 includes a longitudinally extending closed-ended retention track 24. An axle retention element, shown as a bolt 26 in the exemplary embodiment, is fixedly attachable to and protrudes from the first axle element 18 into operative engagement with the closed-ended retention track 24 in the second axle element 20 in such a manner that the axle retention element 26 contacts the closed end 28 of the retention track 24 at a maximum permissible extension of the telescoping axle arrangement 16, to thereby preclude further sliding extension of the second axle element 20 with respect to the first axle element 18.

As shown in FIGS. 2 and 3, the exemplary embodiment of the telescoping axle arrangement 16 also includes a track-width adjusting element, in the form of a hydraulic cylinder 30, that is operatively connected between the first and second axle elements 18,20 for selectively extending and retracting the second element 20 of the telescoping axle 16, for adjusting the track-width of the applicator 10. In various forms of the invention, the track-width adjusting element may be manually operable, or include a powered element such as a hydraulic cylinder 30, an electrically-driven linear actuator, or any other appropriate type of actuator.

As shown in FIG. 2, the frame 12 of the applicator 10 defines a fore-aft axis 32 of the applicator 10 and a transverse axis 34 extending generally transverse to the fore-aft axis 32 and substantially horizontal to the ground surface 13. As noted above, in the exemplary embodiments shown herein the first axle element 18, provided by the tube 22 forming part of the rear of the frame 12, is fixedly attached to the frame 12 with the longitudinal axis 21 of the telescoping axle arrangement 16 extending generally along the transverse axis 34 of the frame 12. The first axle element 18 includes the tubular portion 22 and the second axle element 20 is configured for sliding engagement within the tubular portion 22 of the first axle element 18. The closed end 28 of the retention track 24 is disposed within the tubular portion 22 of the first axle element 18 when the retention element 26 is in contact with the closed end 28 of the retention track 24. The closed-ended retention track 24 may take any appropriate form in practicing the invention, such as an elongated slot, or be configured as a groove 24 in the second axle element 20, as shown herein.

As shown in FIGS, 2 and 3, in the exemplary embodiments described herein, the second axle element 20 is substantially solid structure terminating at a distal end thereof in a mounting pad 38 for attaching an independent suspension element 40 operatively connecting the wheel 14 to the mounting pad 38. As best seen in FIGS. 3 and 4, the first axle element 18 includes a threaded boss 42 for receiving and retaining the axle retention bolt 26. In practicing the invention, the axle retention element may be selected from a group of retention elements consisting of: a pin configured for insertion through and fixed attachment to the boss; and a bolt configured for threaded engagement through and fixed attachment to the boss; or, any take any other appropriate form.

Use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventor for carrying out the invention. Variations of those preferred embodiments may become apparent to those of ordinary skill in the art upon reading the foregoing description. The inventor expects skilled artisans to employ such variations as appropriate, and the inventors intend for the invention to be practiced otherwise than as specifically described herein.

Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A telescoping axle arrangement for an agricultural applicator having a frame supported above a ground surface by a ground engaging wheel operatively connected to the frame by the telescoping axle arrangement, the telescoping axle arrangement having:
   first and second slidingly engaging axle elements adapted for operative connection between the frame and the wheel, for sliding extension and retraction along a longitudinal axis of the axle, the first axle element having a tubular portion and the second axle element having a longitudinally extending closed-end retention track therein;
   a threaded boss projecting from an outer surface of the first axle element; and
   an axle retention element adapted for operative connection between the first and second axle elements for limiting maximum extension of the telescoping axle arrangement; wherein:
   the axle retention element is fixedly attachable to the threaded boss and protrudes from an inner surface of the first axle element into operative engagement with the closed-ended retention track in the second axle element in such a manner that the axle retention element contacts the closed end of the retention track at a maximum permissible extension of the telescoping axle arrangement to thereby preclude farther sliding extension of the second axle element with respect to the first axle element;
   the second ax element is configured for sliding engagement within the tubular portion of the first axle element; and
   the closed end of the retention track is disposed within a tubular portion of the first axle element when the retention element is in contact with the closed end of the retention track.

2. The telescoping axle arrangement of claim 1, wherein the closed end retention track is a groove in the second axle element.

3. The telescoping axle arrangement of claim 1, wherein the axle retention element is selected from a group of retention elements consisting of: a pin configured for insertion through and fixed attachment to the threaded boss; and a bolt configured for threaded engagement through and fixed attachment to the threaded boss.

4. A telescoping axle arrangement for an agricultural applicator having a frame supported above a ground surface by a ground engaging wheel operatively connected to the frame by the telescoping axle arrangement, the telescoping axle arrangement having:
   first and second slidingly engaging axle elements adapted for operative connection between the frame and the wheel, for sliding extension and retraction along a longitudinal axis of the axle, with the second axle element having a longitudinally extending closed-end track therein;
   a threaded boss projecting from an outer surface of the first axle element; and
   an axle retention element adapted for operative connection between the first and second axle elements for limiting maximum extension of the telescoping axle arrangement; wherein:
   the axle retention element is fixedly attachable to the threaded boss and protruding from an inner surface of the first axle element into operative engagement with the closed-ended retention track in the second axle element in such a manner that the axle retention element contacts the closed end of the retention track at a maximum permissible extension of the telescoping axle arrangement to thereby preclude further sliding extension of the second axle element with respect to the first axle element;
   the frame of the applicator defines a fore-aft axis of the applicator, and a transverse axis extending generally transverse to the fore-aft axis and substantially horizontal to the ground surface, and the first axle element is adapted for fixed attachment to the frame with the longitudinal axis of the telescoping axle arrangement extending generally along the transverse axis of the frame;
   the first axle element has a tubular portion and the second axle element is configured for sliding engagement within the tubular portion of the first axle element; and
   the closed end of the retention track is disposed within the tubular portion of the first axle element when the retention element is in contact with the closed end of the retention track.

5. A telescoping axle arrangement for an agricultural applicator having a frame supported above a ground surface by a ground engaging wheel operatively connected to the frame by the telescoping axle arrangement, the telescoping axle arrangement having;
   first and second slidingly engaging axle elements adapted for operative connection between the frame and the wheel, for sliding extension and retraction along a longitudinal axis of the axle, with the second axle element having a longitudinally extending closed-end track therein;
   a threaded boss projecting from an outer surface of the first axle element; and
   an axle retention element adapted for operative connection between the first and second axle elements for limiting maximum extension of the telescoping axle arrangement; wherein:
   the axle retention element is fixedly attachable to the threaded boss and protruding from an inner surface of the first axle element into operative engagement with the closed-ended retention track in the second axle element in such a manner that the axle retention element contacts the closed end of the retention track at a maximum permissible extension of the telescoping axle arrangement to thereby preclude further sliding extension of the second axle element with respect to the first axle element;
   the closed end retention track is a groove in the second axle element; and
   the second axle element is a solid structure terminating at a distal end thereof in a mounting pad for attaching an independent suspension element operatively connecting the wheel to the mounting pad.

6. A frame for an agricultural applicator having a telescoping axle arrangement for adjusting a track width of the applicator, wherein:

the frame is configured to be supported above a ground surface by a ground engaging wheel operatively connected to the frame by the telescoping axle arrangement; and the telescoping axle arrangement includes first and second axle elements and an axle retention element, the first axle element having a tubular portion and including a threaded boss projecting from an outer surface of the first axle element;

wherein:

the first and second slidingly engaging axle elements being adapted for operative connection between the frame and the wheel, for sliding extension and retraction along a longitudinal axis of the axle, with the second axle element having a longitudinally extending closed-end track therein;

the second axle element is configured for sliding engagement within the tubular portion of the first axle element;

the axle retention element being adapted for operative connection between the first and second axle elements for limiting maximum extension of the telescoping axle arrangement;

the axle retention element being fixedly attachable to the threaded bore and protruding from an inner surface of the first axle element into operative engagement with the closed-ended retention track in the second axle element in such a manner that the axle retention element contacts the closed end of the retention track at a maximum permissible extension of the telescoping axle arrangement to thereby preclude further sliding extension of the second axle element with respect to the first axle element; and the closed end of the track is disposed within the tubular portion of the first axle element when the axle retention element is in contact with the closed end of the track.

7. The frame of claim 6, wherein the closed end retention track is a groove in the second axle element.

8. The frame of claim 6 wherein the axle retention element is selected from a group of retention elements consisting of: a pin configured for insertion through and fixed attachment to the threaded boss; and a bolt configured for threaded engagement through and fixed attachment to the threaded boss.

9. A frame for an agricultural applicator having a telescoping axle arrangement for adjusting a track width of the applicator, wherein:

the frame is configured to be supported above a ground surface by a ground engaging wheel operatively connected to the frame by the telescoping axle arrangement;

the telescoping axle arrangement includes first and second axle elements and an axle retention element, the first axle element including a threaded boss projecting from an outer surface of the first axle element;

the first and second slidingly engaging axle elements being adapted for operative connection between the frame and the wheel, for sliding extension and retraction along a longitudinal axis of the axle, with the second axle element having a longitudinally extending closed-end track therein; and the axle retention element being adapted for operative connection between the first and second axle elements for limiting maximum extension of the telescoping axle arrangement;

the axle retention element being fixedly attachable to the threaded bore and protruding from an inner surface of the first axle element into operative engagement with the closed-ended retention track in the second axle element in such a manner that the axle retention element contacts the closed end of the retention track at a maximum permissible extension of the telescoping axle arrangement to thereby preclude further sliding extension of the second axle element with respect to the first axle element;

the frame of the applicator defines a fore-aft axis of the applicator, and a transverse axis extending generally transverse to the fore-aft axis and substantially horizontal to the ground surface, and the first axle element is adapted for fixed attachment to the frame with the longitudinal axis of the telescoping axle arrangement extending generally along the transverse axis of the frame;

the first axle element has a tubular portion and the second axle element is configured for sliding engagement within the tubular portion of the first axle element; and the closed end of the retention track is disposed within the tubular portion of the first axle element when the retention element is in contact with the closed end of the retention track.

10. A frame for an agricultural applicator having a telescoping axle arrangement for adjusting a track width of the applicator, wherein:

the frame is configured to be supported above a ground surface by a ground engaging wheel operatively connected to the frame by the telescoping axle arrangement; and the telescoping axle arrangement includes first and second axle elements and an axle retention element, the first axle element including a threaded boss projecting from an outer surface of the first axle element;

the first and second slidingly engaging axle elements being adapted for operative connection between the frame and the wheel, for sliding extension and retraction along a longitudinal axis of the axle, with the second axle element having a longitudinally extending closed-end track therein; and the axle retention element being adapted for operative connection between the first and second axle elements for limiting maximum extension of the telescoping axle arrangement;

the axle retention element being fixedly attachable to the threaded bore and protruding from an inner surface of the first axle element into operative engagement with the closed-ended retention track in the second axle element in such a manner that the axle retention element contacts the closed end of the retention track at a maximum permissible extension of the telescoping axle arrangement to thereby preclude further sliding extension of the second axle element with respect to the first axle element;

the frame of the applicator defines a fore-aft axis of the applicator, and a transverse axis extending generally transverse to the fore-aft axis and substantially horizontal to the ground surface, and the first axle element is adapted for fixed attachment to the frame with the longitudinal axis of the telescoping axle arrangement extending generally along the transverse axis of the frame;

the closed end retention track is a groove in the second axle element; and the second axle element is a substantially solid structure terminating at a distal end thereof in a mounting pad for attaching an independent suspension element operatively connecting the wheel to the mounting pad.

11. An agricultural applicator including a frame having a telescoping axle arrangement for adjusting a track width of the applicator, wherein:

the frame is configured to be supported above a ground surface by a ground engaging wheel operatively connected to the frame by the telescoping axle arrangement; and the telescoping axle arrangement includes first and second axle elements and an axle retention element, the first axle element including a threaded boss projecting from an outer surface of the first axle element;

the first and second slidingly engaging axle elements being adapted for operative connection between the frame and the wheel, for sliding extension and retraction along a longitudinal axis of the axle, with the second axle element having a longitudinally extending closed-end track therein;

the axle retention element being adapted for operative connection between the first and second axle elements for limiting maximum extension of the telescoping axle arrangement;

the axle retention element being fixedly attachable to the threaded bore and protruding from an inner surface of the first axle element into operative engagement with the closed-ended retention track in the second axle element in such a manner that the axle retention element contacts the closed end of the retention track at a maximum permissible extension of the telescoping axle arrangement to thereby preclude further sliding extension of the second axle element with respect to the first axle element;

the first axle element has a tubular portion and the second axle element is configured for sliding engagement within the tubular portion of the first axle element; and the closed end of the retention track is disposed within the tubular portion of the first axle element when the retention element is in contact with the closed end of the retention track.

12. The agricultural applicator of claim 11, wherein the axle retention element is selected from a group of retention elements consisting of: a pin configured for insertion through and fixed attachment to the threaded boss; and a bolt configured for threaded engagement through and fixed attachment to the threaded boss.

13. An agricultural applicator including a frame having a telescoping axle arrangement for adjusting a track width of the applicator, wherein:

the frame is configured to be supported above a ground surface by a ground engaging wheel operatively connected to the frame by the telescoping axle arrangement; and the telescoping axle arrangement includes first and second axle elements and an axle retention element, the first axle element including a threaded boss projecting from an outer surface of the first axle element;

the first and second slidingly engaging axle elements being adapted for operative connection between the frame and the wheel, for sliding extension and retraction along a longitudinal axis of the axle, with the second axle element having a longitudinally extending closed-end track therein; and the axle retention element being adapted for operative connection between the first and second axle elements for limiting maximum extension of the telescoping axle arrangement;

the axle retention element being fixedly attachable to the threaded bore and protruding from an inner surface of the first axle element into operative engagement with the closed-ended retention track in the second axle element in such a manner that the axle retention element contacts the closed end of the retention track at a maximum permissible extension of the telescoping axle arrangement to thereby preclude further sliding extension of the second axle element with respect to the first axle element;

the frame of the applicator defines a fore-aft axis of the applicator, and a transverse axis extending generally transverse to the fore-aft axis and substantially horizontal to the ground surface, and the first axle element is adapted for fixed attachment to the frame with the longitudinal axis of the telescoping axle arrangement extending generally along the transverse axis of the frame;

the first axle element has a tubular portion and the second axle element is configured for sliding engagement within the tubular portion of the first axle element; and the closed end of the retention track is disposed within the tubular portion of the first axle element when the retention element is in contact with the closed end of the retention track.

14. The agricultural applicator of claim 13, further including a track-width adjusting element operatively connected between the first and second axle elements for selectively extending and retracting the telescoping axle for adjusting the track-width of the applicator.

15. The agricultural applicator of claim 14, wherein:

the second axle element is a substantially solid structure terminating at a distal end thereof in a mounting pad for attaching an independent suspension element operatively connecting the wheel to the mounting pad; and the closed end retention track is a groove in the second axle element.

* * * * *